United States Patent
Army et al.

(10) Patent No.: US 11,085,673 B2
(45) Date of Patent: Aug. 10, 2021

(54) ADVANCED ENVIRONMENTAL CONTROL SYSTEM IN AN INTEGRATED SIMPLE CYCLE PACK

(71) Applicant: Hamilton Sundstrand Corporation, Charlotte, NC (US)

(72) Inventors: Donald E. Army, Enfield, CT (US); Louis J. Bruno, Ellington, CT (US); Sherif M. Kandil, South Windsor, CT (US); Matthew Pess, West Hartford, CT (US); Robert C. Roy, West Springfield, MA (US); Eric Surawski, Glastonbury, CT (US); Joseph Turney, Amston, CT (US); Lawrence E. Zeidner, West Hartford, CT (US); Paul M. D'Orlando, Simsbury, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 156 days.

(21) Appl. No.: 15/648,132

(22) Filed: Jul. 12, 2017

(65) Prior Publication Data
US 2018/0312263 A1 Nov. 1, 2018

Related U.S. Application Data

(60) Provisional application No. 62/491,554, filed on Apr. 28, 2017.

(51) Int. Cl.
*F25B 9/06* (2006.01)
*B64D 13/06* (2006.01)
*F02C 6/08* (2006.01)

(52) U.S. Cl.
CPC ............... *F25B 9/06* (2013.01); *B64D 13/06* (2013.01); *F02C 6/08* (2013.01); *F05D 2220/323* (2013.01); *Y02T 50/50* (2013.01)

(58) Field of Classification Search
CPC .............. F25B 9/06; B64D 2013/0618; B64D 2013/0648; F02C 6/08
See application file for complete search history.

(56) References Cited

U.S. PATENT DOCUMENTS

| 2,851,254 A | 9/1958 | Messinger et al. |
| 4,021,215 A | 5/1977 | Rosenbush et al. |
| 5,461,882 A | 10/1995 | Zywiak et al. |

(Continued)

FOREIGN PATENT DOCUMENTS

| EP | 0891279 B1 | 8/2001 |
| WO | 9932358 A1 | 7/1999 |

OTHER PUBLICATIONS

Extended European Search Report; European Application No. 18170059.2; dated Sep. 10, 2018; 9 Pages.

(Continued)

*Primary Examiner* — David J Teitelbaum
(74) *Attorney, Agent, or Firm* — Cantor Colburn LLP

(57) ABSTRACT

An environmental control system of an aircraft includes a ram air circuit including a ram air shell having a heat exchanger positioned therein and a dehumidification system arranged in fluid communication with the ram air circuit. A plurality of expansion devices is arranged in fluid communication with the ram air circuit and the dehumidification system. At least one of the expansion devices is a simple cycle expansion device.

16 Claims, 6 Drawing Sheets

(56) References Cited

U.S. PATENT DOCUMENTS

| | | | |
|---|---|---|---|
| 5,704,218 | A | 1/1998 | Christians et al. |
| 6,199,387 | B1 | 3/2001 | Sauterleute |
| 7,000,425 | B2 | 2/2006 | Army et al. |
| 7,188,488 | B2 | 3/2007 | Army et al. |
| 9,598,175 | B2 | 3/2017 | Devalve |
| 9,669,936 | B1 | 6/2017 | Fiterman et al. |
| 2003/0126880 | A1* | 7/2003 | Zywiak ............... B64D 13/06 62/402 |
| 2003/0177780 | A1 | 9/2003 | Brutscher et al. |
| 2017/0057641 | A1 | 3/2017 | Koerner et al. |

OTHER PUBLICATIONS

European Office Action; Application No. 18170059.2-1010; dated Dec. 2, 2019; 7 pages.
European Office Action; International Application No. 18170059.2-1010; International Filing Date: Apr. 30, 2018; dated Aug. 27, 2020; 5 pages.

\* cited by examiner

ADVANCED ENVIRONMENTAL CONTROL SYSTEM IN AN INTEGRATED SIMPLE CYCLE PACK

CROSS REFERENCE TO RELATED APPLICATIONS

This application claims the benefit of U.S. Provisional Application No. 62/491,554 filed Apr. 28, 2017, the content of which is incorporated by reference in its entirety herein.

BACKGROUND

Exemplary embodiments pertain to the art of environment control systems and, in particular, to an aircraft environmental control system (ECS).

In general, contemporary air conditioning systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn. An approach using bleed and cabin outflow air to power a single simplified and integrated refrigeration package, offering the operational redundancy of a typical two-pack ECS is described herein.

BRIEF DESCRIPTION

According to an embodiment, an environmental control system of an aircraft includes a ram air circuit including a ram air shell having a heat exchanger positioned therein and a dehumidification system arranged in fluid communication with the ram air circuit. A plurality of expansion devices is arranged in fluid communication with the ram air circuit and the dehumidification system. At least one of the expansion devices is a simple cycle expansion device.

In addition to one or more of the features described above, or as an alternative, in further embodiments the plurality of expansion devices are arranged in parallel.

In addition to one or more of the features described above, or as an alternative, in further embodiments comprising at least one valve operable to control a flow of fluid to the plurality of expansion devices.

In addition to one or more of the features described above, or as an alternative, in further embodiments in a first position, the at least one valve is configured to direct the flow of fluid to only a portion of the plurality of expansion devices.

In addition to one or more of the features described above, or as an alternative, in further embodiments in a second position, the at least one valve is configured to direct the flow of fluid to each of the plurality of expansion devices.

In addition to one or more of the features described above, or as an alternative, in further embodiments the ram air circuit includes a plurality of independent outlets formed in the shell.

In addition to one or more of the features described above, or as an alternative, in further embodiments at least one outlet is associated with each of the plurality of expansion devices.

In addition to one or more of the features described above, or as an alternative, in further embodiments the plurality of expansion devices are substantially identical.

In addition to one or more of the features described above, or as an alternative, in further embodiments each of the plurality of expansion devices further comprises a turbine configured to provide energy by expanding a first medium therein.

In addition to one or more of the features described above, or as an alternative, in further embodiments the first medium is bleed air.

In addition to one or more of the features described above, or as an alternative, in further embodiments the bleed air circuit is drawn from at least one of an engine and an auxiliary power unit.

In addition to one or more of the features described above, or as an alternative, in further embodiments each of the plurality of expansion devices further comprises a fan configured to receive energy from a second medium.

In addition to one or more of the features described above, or as an alternative, in further embodiments the second medium is fresh air.

In addition to one or more of the features described above, or as an alternative, in further embodiments the fan is operably coupled to the turbine via a shaft.

In addition to one or more of the features described above, or as an alternative, in further embodiments the fan is arranged in fluid communication with the ram air circuit.

In addition to one or more of the features described above, or as an alternative, in further embodiments the at least one simple cycle expansion device includes a two-wheel air cycle machine.

In addition to one or more of the features described above, or as an alternative, in further embodiments the environment control system is mounted within a single bay of the aircraft.

In addition to one or more of the features described above, or as an alternative, in further embodiments the environment control system is mounted within multiple bays of an aircraft.

According to another embodiment, an environmental control system of an aircraft includes a ram air circuit including a ram air shell having a heat exchanger positioned therein and a dehumidification system arranged in fluid communication with the ram air circuit. The dehumidification system includes a condenser and a high pressure water collector. A plurality of expansion devices is arranged in fluid communication with the ram air circuit and the dehumidification system.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
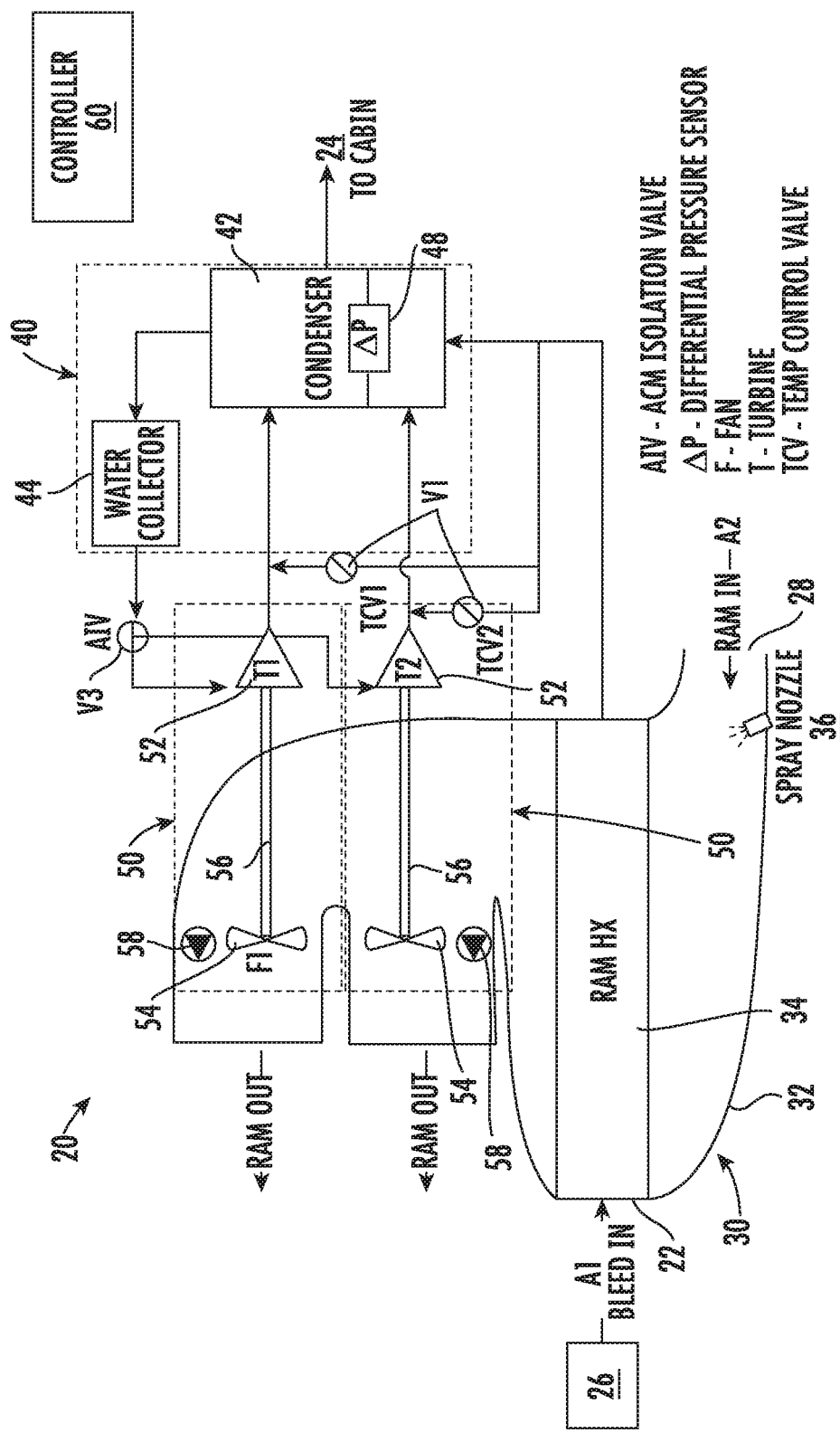
FIG. 1 is a schematic illustration of pack of an environmental control system of an aircraft according to an embodiment.
Figure 2:
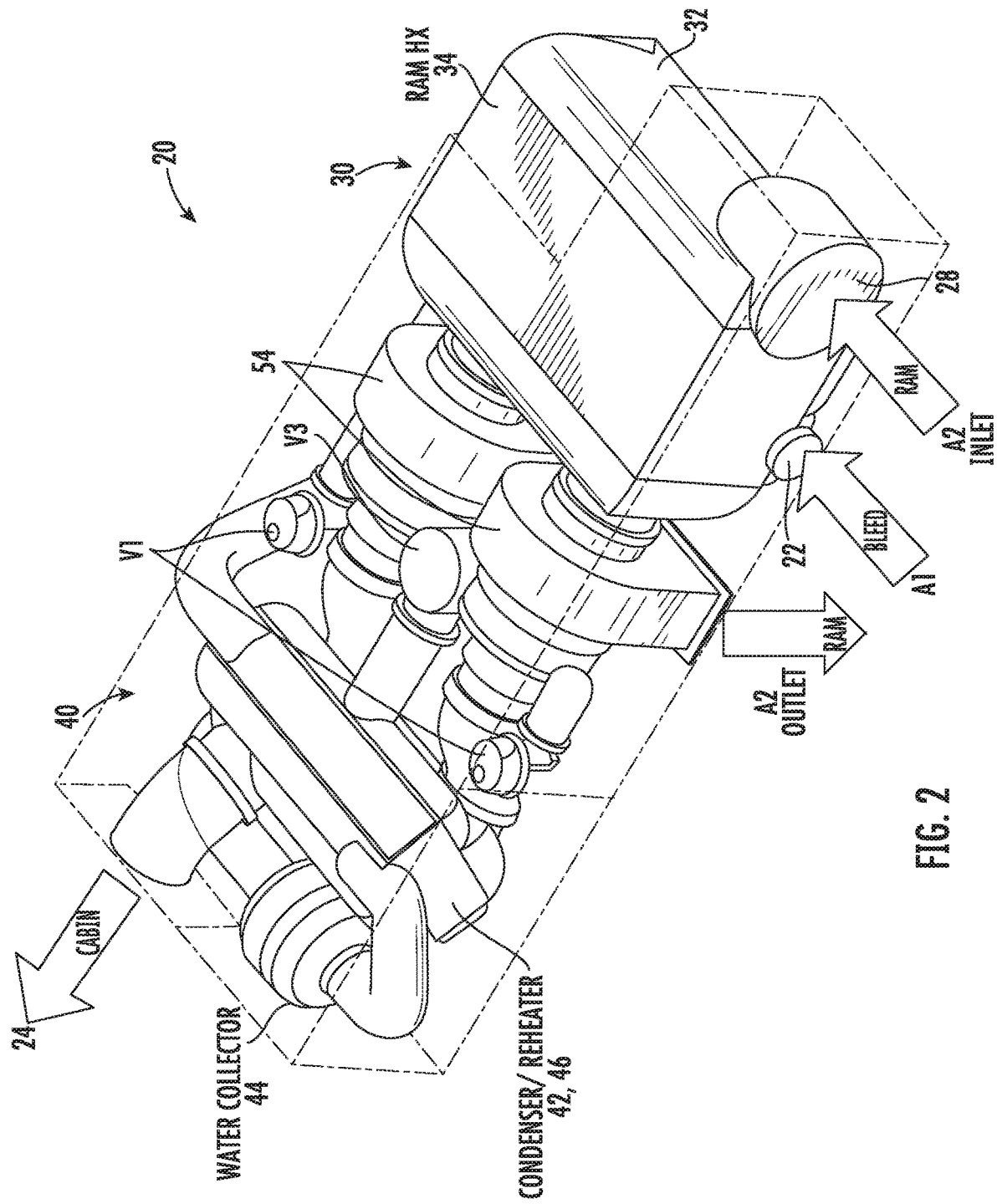
FIG. 2 is a perspective view of the pack of an environmental control system of FIG. 1 according to an embodiment.
Figure 3:
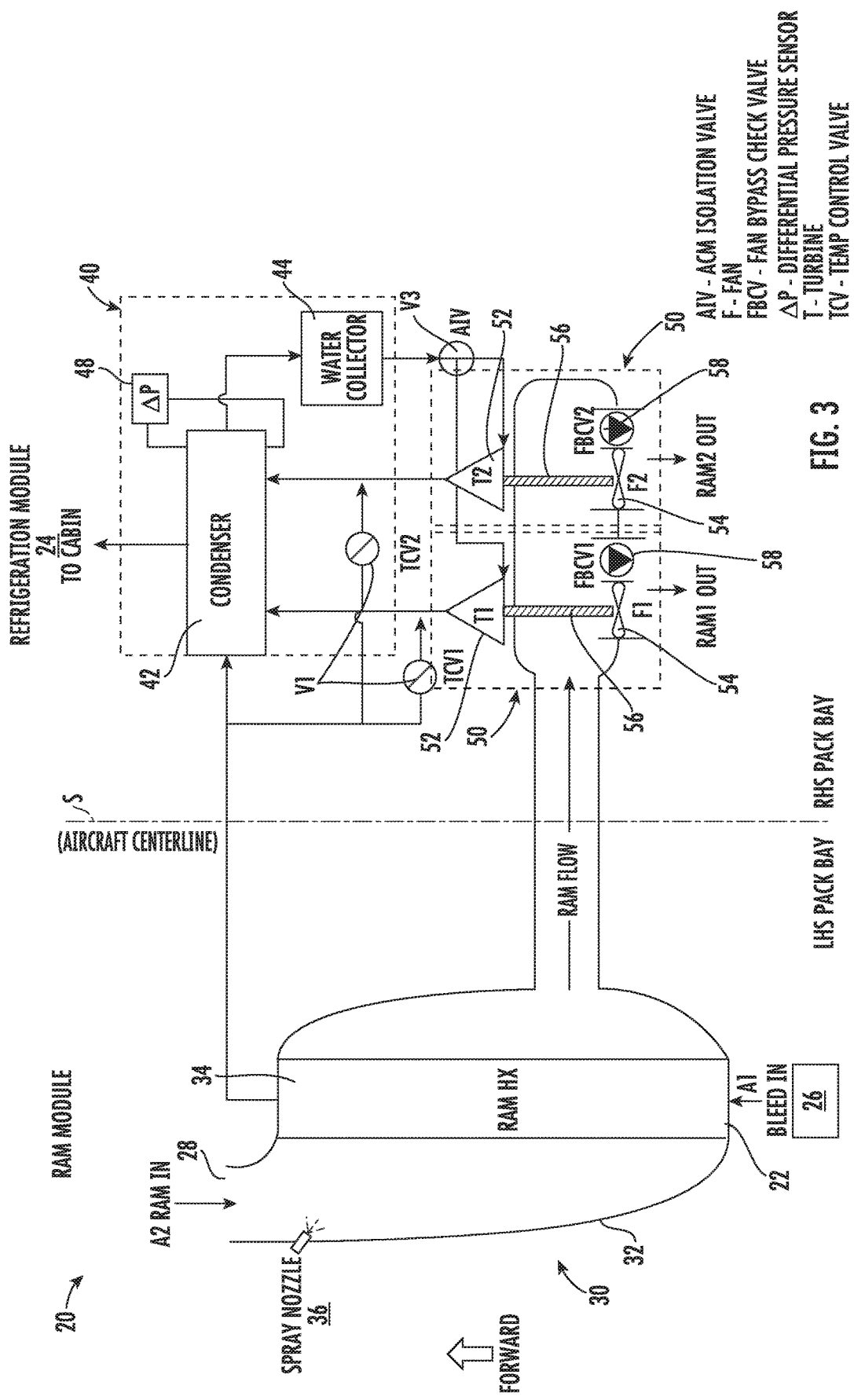
FIG. 3 is a schematic illustration of another pack of an environmental control system of an aircraft according to an embodiment.
Figure 4:
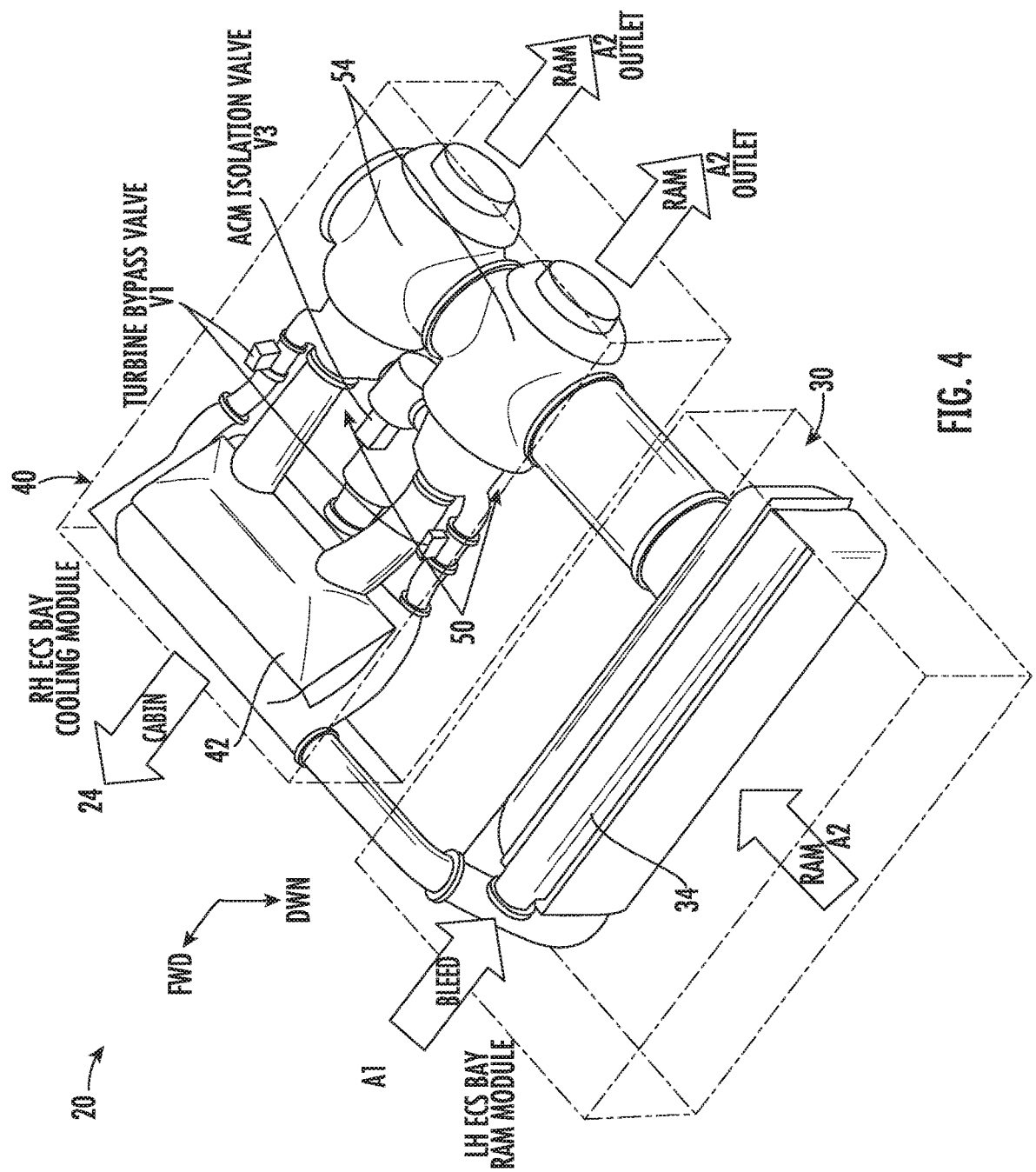
FIG. 4 is a perspective view of the pack of an environmental control system of FIG. 3 according to an embodiment.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Embodiments herein provide an environmental control system of an aircraft that uses mediums from different sources to power the environmental control system and to provide cabin pressurization and cooling at high fuel burning efficiency. The mediums described herein are generally types of air; however, it should be understood that other mediums, such as gases, liquids, fluidized solids, or slurries are also contemplated herein.

With reference now to the FIGS. various examples of an environment control system (ECS) according to a plurality of non-limiting embodiments are depicted. Although the environmental control system 20 is described with reference to an aircraft, alternative applications are also within the scope of the disclosure.

As shown in the FIGS., the system 20 can receive a first medium A1 at a first inlet 22 and provide a conditioned form of the first medium A1 to a volume 24. In embodiments where the environmental control system 20 is used in an aircraft application, the first medium A1 is bleed air, which is pressurized air originating from i.e. being "bled" from, an engine or auxiliary power unit of the aircraft, illustrated schematically at 26. Note that one or more of the temperature, humidity, and pressure of the bleed air can vary based upon a compressor stage and revolutions per minute of the engine.

The system 20 also receives a second medium A2 from an inlet 28. In an embodiment, the second medium A2 is fresh air, such as outside air for example. The outside air can be procured via one or more scooping mechanisms, such as an impact scoop or a flush scoop for example. Thus, the inlet 28 can be considered a fresh air inlet or an outside air inlet. Generally, the fresh air A2 described herein is at an ambient pressure outside of the aircraft with respect to altitude.

The environmental control system (ECS) 20 includes a RAM air circuit 30 including a shell or duct 32 within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the RAM air circuit 30 includes only a single heat exchanger 34. However, embodiments where the RAM air circuit 30 includes multiple heat exchangers, such as a conventional primary heat exchanger and secondary heat exchanger are also contemplated herein. Within the RAM air heat exchanger 34, ram air, such as outside air or the second medium A2 for example, acts as a heat sink to cool the first medium A1, for example bleed air.

The ram air heat exchanger 34 may comprise a single pass, or alternatively, may have a multi-pass configuration. In an embodiment, shown in FIGS. 5 and 6, the ram air heat exchanger 34 has a multi-pass configuration such that the first medium A1 is configured to make a first pass and a second pass there through. However, a ram air heat exchanger of any number of passes, for example greater than two passes, is contemplated herein.

In an embodiment, the ram air circuit 30 may additionally include one or more spray nozzles 36. The spray nozzles 36 may be mounted to an interior of the shell 32 and are configured to deliver a fluid, in a liquid or atomized state, to the ram inlet circuit of heat exchanger 34. In an embodiment, the fluid delivered by the spray nozzle 36 is applied to only one of the passes of the heat exchanger 34, such as the second pass shown in FIGS. 5 and 6. However, in other embodiments, the spray nozzle 36 may be configured to supply a fluid to the entire heat exchanger 34.

The system 20 also comprises a dehumidification system 40. In the illustrated, non-limiting embodiment of FIGS. 1-4, the dehumidification system 40 includes a condenser 42 and a water collector 44. The condenser 42 is a particular type of heat exchanger and the water collector 44 is a mechanical device that performs a process of removing water from a medium. In an embodiment, the water collector 44 is a high pressure water separator that removes moisture from a medium at a highest pressure within an environmental control system 20 (e.g., downstream of the ram air heat exchanger 34). In an embodiment, shown in FIGS. 5 and 6, the dehumidification system 40 further includes a reheater 46. The reheater 46 is another type of heat exchanger configured to increase the temperature of the air as it passes there through. The reheater 46 may be arranged generally upstream from the condenser 42 such that the first medium A1 is configured to flow through the reheater 46 and then the condenser 42 sequentially. As shown, the condenser 42 may include a pressure sensor 48 configured to monitor or detect a change in pressure drop across the condenser 42.

The system 20 additionally comprises at least one expansion device 50. In the illustrated, non-limiting embodiment, the system 20 includes a pair of expansion devices 50 arranged in parallel. However, a system 20 including more than two expansion devices 50 is also contemplated herein. The expansion devices 50 of the system 20, may, but need not be substantially identical.

Each expansion device 50 of the system 20 is a mechanical device that includes components for performing thermodynamic work on a medium (e.g., extracts work from or applies work to the first medium A1 and/or the second medium A2 by raising and/or lowering pressure and by raising and/or lowering temperature). Examples of the expansion device 50 include an air cycle machine etc.

In the illustrated, non-limiting embodiment, each expansion device 50 is a two-wheel air cycle machine including a turbine 52 and a fan 54 operably coupled via a shaft 56. However, it should be understood that any suitable expansion device, including an air cycle machine having any number of wheels (i.e. three-wheel or four-wheel) are also within the scope of the disclosure. The turbine 52 is a mechanical device that expands and extracts work from a medium (also referred to as extracting energy). In the expansion devices 50, the turbine 52 drives rotation of the fan 54 via the shaft 56. In a non-limiting embodiment, the turbine 52 can comprise a nozzle configured to accelerate the first medium A1 for entry into a turbine impeller (not shown). The fan 54 is a mechanical device that can force via push or pull methods a medium (e.g., ram air) through the shell 32 across the one or more ram heat exchangers 34 and at a variable cooling to control temperatures. As shown, a fan bypass check valve 58 may be arranged generally adjacent each fan 54. The fan bypass check valve 58 may be selectively operated to allow air from within the shell 32 to bypass the fan when being exhausted overboard.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. In an embodiment, best shown in FIG. 1, the system 20 includes a controller 60 operably coupled to the valves, the condenser pressure sensor 48, and the fan bypass check valves 58. The controller 60 may be configured to or operate one or more of the valves or sensors coupled thereto to control operation of the system within a desired mode.

For instance, in the embodiment of FIGS. 1-4, one or more valves V1 are operable to control whether a portion of the flow of first medium A1 from the ram air heat exchanger 34 bypasses the turbine 52 in accordance with a mode of the system. In some embodiments, best shown in FIGS. 5 and 6, a second valve V2 arranged upstream from the first valve V1 is operable to control whether the flow of medium bypasses a first pass through the dehumidification system 40. In the embodiments illustrated in FIGS. 1-4, the functionality of the first and second valves V1 and V2 may be integrated into a single valve. In addition, another valve V3 is arranged at the interface between a fluid flow path connected to a turbine inlet of the first expansion device 50 and a fluid flow path connected to a turbine inlet of the second expansion device 50. Operation of the valve V3 is configured to control whether a fluid flow of a first medium is directed to all or only a portion of the plurality of expansion devices 50.

Figure 5:
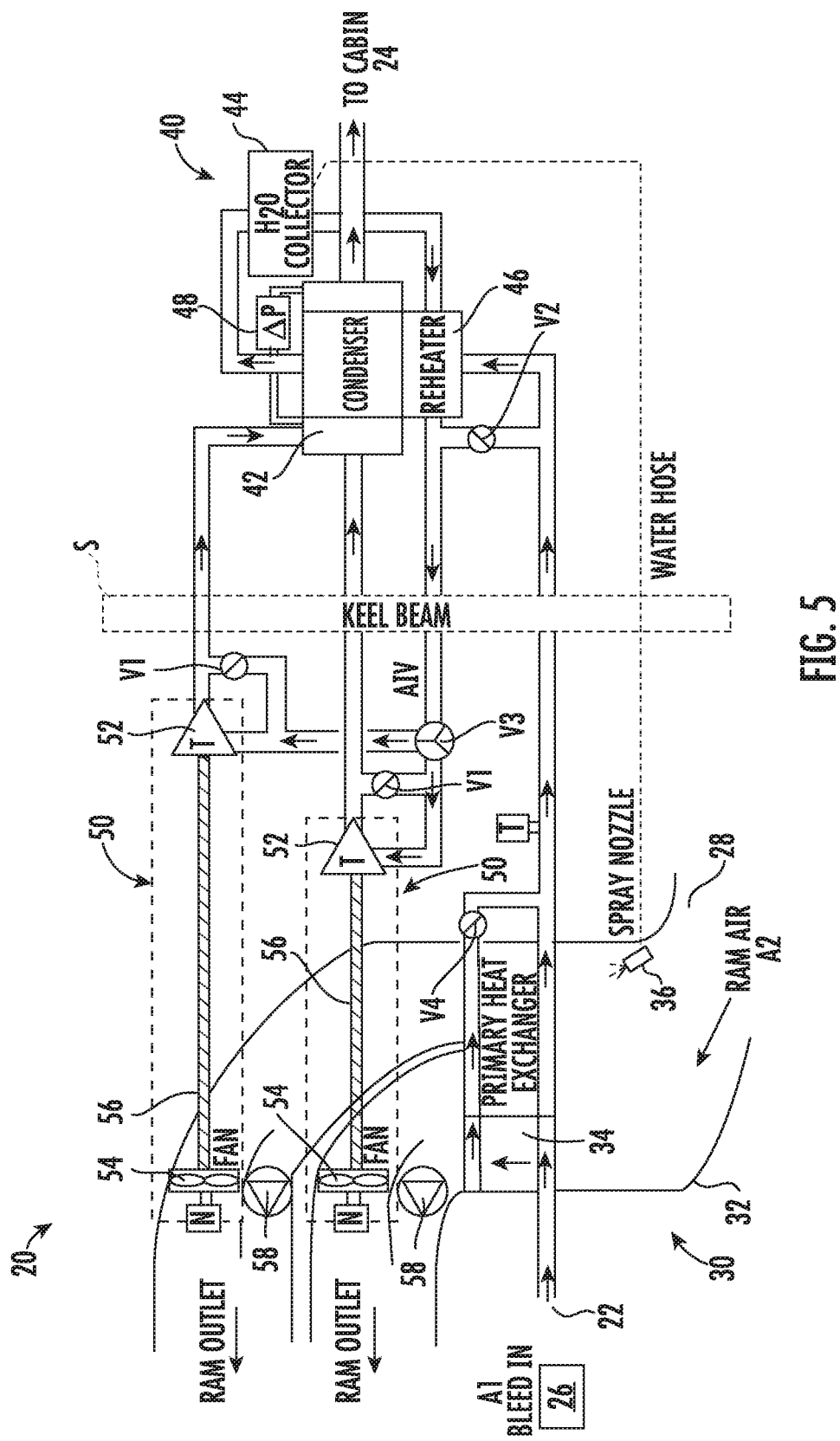
FIG. 5 is a schematic illustration of another pack of an environmental control system of an aircraft according to an embodiment.
Figure 6:
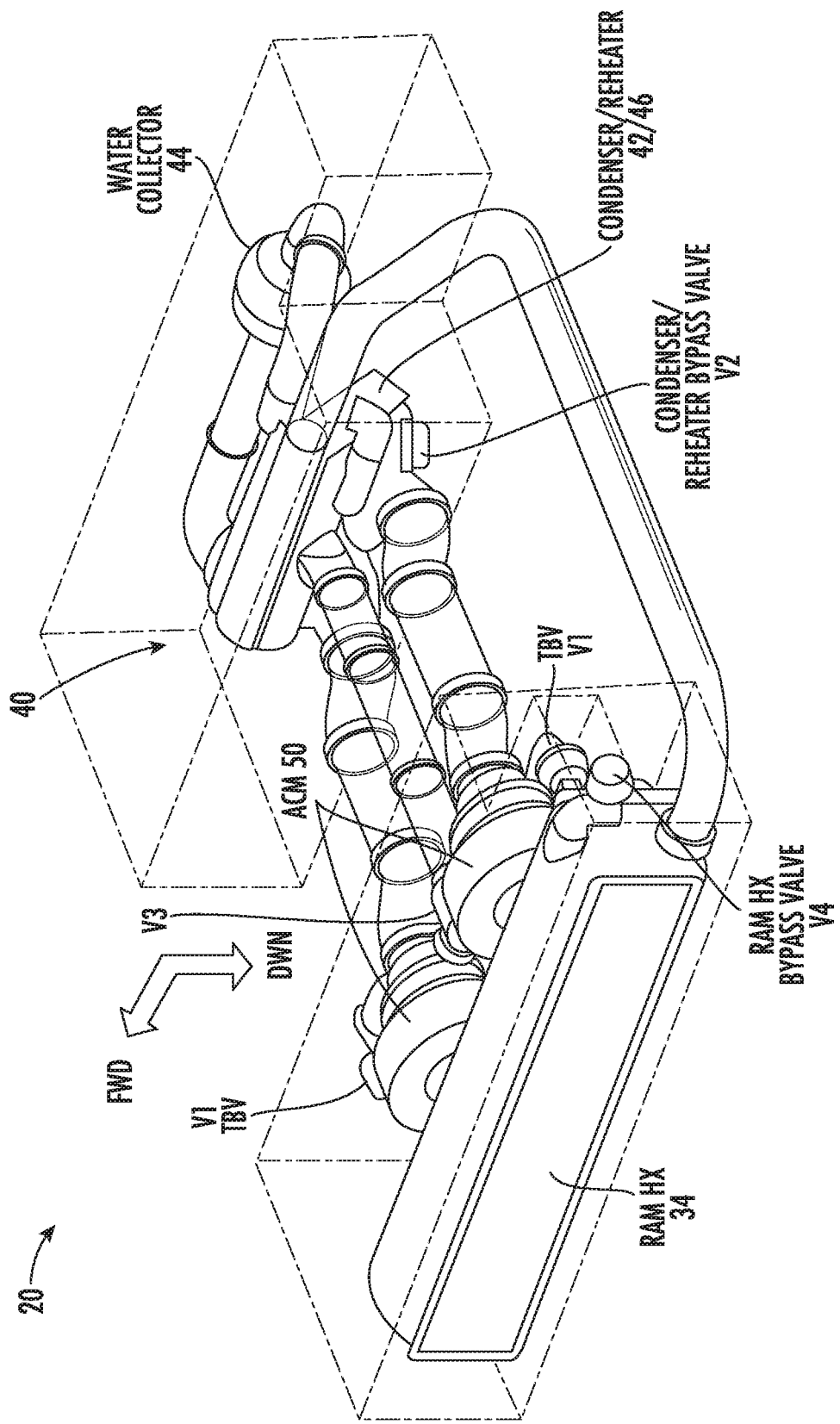
FIG. 6 is a perspective view of the pack of an environmental control system of FIG. 5 according to an embodiment.

In embodiments where the ram air heat exchanger 34 has a multi-pass configuration, such as shown in FIGS. 5 and 6, another valve V4 may be arranged in communication with the intermediate header of the heat exchanger 34. The valve V4 may be operated to control the fluid flow path through the heat exchanger. For example, in embodiments where the valve V4 is closed, and flow through a bypass conduit arranged in fluid communication with the intermediate header is blocked, the medium will flow through the plurality of passes of the heat exchanger. However, when the valve V4 is open, in the illustrated, non-limiting embodiment, the flow of the first medium is configured to bypass at least one of the passes within the heat exchanger, and is provided from the intermediate header to a downstream component of the system 20.

Note that a combination of components and elements of the system 20 can be referred to as an air conditioning package or a pack. The pack can exist between the inlet, the volume, the outlet, and an exhaust of the shell. In the illustrated, non-limiting embodiment, the system configuration is considered an integrated air conditioning pack because the flow from a single ram air circuit 30 and a single dehumidification system 40 is shared by each of the expansion devices 50.

The integrated environmental control system 20 described herein has a reduced number of components compared to conventional 2 pack systems, resulting in both a cost and weight benefit. Further, by operably coupling a ram air circuit and dehumidification system to a plurality of expansion devices 50, it is possible to mount the entire system 20 within a single bay of an aircraft. In other embodiments, the system 20 may be divided between multiple bays. In the illustrated, non-limiting embodiment of FIGS. 3 and 4, the ram air circuit 30 and the at least one expansion device 50 are mounted in a non-linear relationship, for example on opposing sides of a structural member S of an aircraft, such as a keel beam for example. Alternatively, the ram air circuit 30 and at least one expansion device 50 may be arranged on a first side of the structural component S, and the dehumidification system 40 may be located adjacent a second, opposite side of the structural component S, as shown in FIGS. 5 and 6. The total number of holes formed in the structural component S will vary based on the selected configuration and mounting position of the system 20. It should be understood that the various schematics illustrated and described herein are intended as an example only, and other configurations of the system 20 are also within the scope of the disclosure.

Operation of the system 20 will now be described with respect to an aircraft. With references to FIGS. 1-4, during operation, the bleed air A1 drawn from either an engine or the auxiliary power unit (e.g., the inlet 22) is provided to the ram air heat exchanger 34. Within the ram air heat exchanger 34, the bleed air A1 is cooled via the second medium A2 to produce cool bleed air. Valve V1 is arranged within a conduit, downstream from the ram air heat exchanger 34. When the valve V1 is in a first, open position, after being cooled in the ram air heat exchanger 34, the flow of bleed air A1 is configured to bypass the majority of the system 20 including a first pass through the dehumidification system 40 and the turbine 52. As a result, when the valves V1 are in the first position, at least a portion of the bleed air output from the ram air heat exchanger 34 is provided directly to the condenser 42, where it is cooled, before being directed into the volume 24.

When the valves V1 are in a second, closed position, the cool bleed air A1 is provided to the dehumidification assembly 40. Within the dehumidification assembly 40, the bleed air A1 is first provided to the condenser 42, where the temperature of the bleed air A1 is chilled by turbine 52, allowing moisture entrained in the bleed air to be condensed. The resultant bleed air flows through the water collector 44 where any condensed moisture is removed to produce dried bleed air. From the dehumidification assembly 40, the dried bleed air A1 is provided to the turbine 52 of one or both of the expansion devices 50. The condensed moisture from the water collector 44 may be supplied to spray nozzle 36 where it is used to provide additional cooling to ram heat exchanger 34. In an embodiment, the dried bleed air enters the turbines 52 through an inlet, where it is expanded and work is extracted. The work extracted by the turbine 52 of one or both expansion devices 50, is used to drive the fans 54 that move the second medium A2 ram air through the ram air heat exchanger 34.

The integrated environmental control system 20 described herein has a reduced number of components compared to conventional 2 pack systems, resulting in both a cost and weight benefit. Further, by operably coupling a ram air circuit and dehumidification system to a plurality of expansion devices 50, it is possible to mount the system 20 within a single bay of an aircraft, such as the tail cone for example.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft, comprising:
   a ram air circuit including a ram air shell having a heat exchanger positioned therein;
   a dehumidification system arranged in fluid communication with the ram air circuit, the dehumidification system having an outlet; and
   a plurality of expansion devices including a first expansion device and a second expansion device arranged in fluid communication with the ram air circuit and the dehumidification system, wherein at least one of the plurality of expansion devices is a two wheel air cycle machine and the first and second expansion device includes a first turbine and a second turbine, respectively, and an inlet of the first turbine and an inlet of the second turbine is fluidly connected to the outlet of the dehumidification system such that a flow of medium at the outlet of the dehumidification system is providable to the inlet of each of the first expansion device and the second expansion device in parallel; and
   a valve arranged downstream from the outlet of the dehumidification system and upstream from an inlet of the first turbine and an inlet of the second turbine, the valve being operable to direct a flow of a medium to all or a portion of the plurality of expansion devices.

2. The environmental control system of claim 1, wherein in a first position, the at least one valve is configured to direct the flow of fluid to only a portion of the plurality of expansion devices.

3. The environmental control system of claim 2, wherein in a second position, the at least one valve is configured to direct the flow of fluid to each of the plurality of expansion devices.

4. The environmental control system of claim 1, wherein the ram air circuit includes a plurality of independent outlets formed in the shell.

5. The environmental control system of claim 4, wherein at least one outlet is associated with each of the plurality of expansion devices.

6. The environmental control system of claim 1, wherein the plurality of expansion devices are substantially identical.

7. The environmental control system of claim 1, wherein each of the plurality of expansion devices further comprises a turbine configured to provide energy by expanding a first medium therein.

8. The environmental control system of claim 7, wherein the first medium is bleed air.

9. The environmental control system of claim 8, wherein the bleed air circuit is drawn from at least one of an engine and an auxiliary power unit.

10. The environmental control system of claim 7, wherein each of the plurality of expansion devices further comprises a fan configured to receive energy from a second medium.

11. The environmental control system of claim 10, wherein the second medium is fresh air.

12. The environmental control system of claim 10, wherein the fan is operably coupled to the turbine via a shaft.

13. The environmental control system of claim 10, wherein the fan is arranged in fluid communication with the ram air circuit.

14. The environmental control system of claim 1, wherein the at least one simple cycle expansion device includes a two-wheel air cycle machine.

15. The environmental control system of claim 1, wherein the environment control system is mounted within a single bay of the aircraft.

16. The environmental control system of claim 1, wherein the environment control system is mounted within multiple bays of an aircraft.

* * * * *